(12) United States Patent
Park

(10) Patent No.: US 12,301,912 B2
(45) Date of Patent: May 13, 2025

(54) DISPLAY DEVICE FOR PROVIDING SPEECH RECOGNITION SERVICE

(71) Applicant: LG ELECTRONICS INC., Seoul (KR)

(72) Inventor: Daegun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 389 days.

(21) Appl. No.: 17/607,686

(22) PCT Filed: Apr. 30, 2019

(86) PCT No.: PCT/KR2019/005169
§ 371 (c)(1),
(2) Date: Oct. 29, 2021

(87) PCT Pub. No.: WO2020/222322
PCT Pub. Date: Nov. 5, 2020

(65) Prior Publication Data
US 2022/0232278 A1  Jul. 21, 2022

(51) Int. Cl.
*G10L 15/24* (2013.01)
*G06F 16/9535* (2019.01)
*G10L 15/22* (2006.01)
*H04N 21/422* (2011.01)
*H04N 21/431* (2011.01)
*H04N 21/442* (2011.01)

(52) U.S. Cl.
CPC ... *H04N 21/42204* (2013.01); *G06F 16/9535* (2019.01); *G10L 15/22* (2013.01); *H04N 21/431* (2013.01); *H04N 21/44204* (2013.01); *G10L 2015/223* (2013.01); *G10L 2015/227* (2013.01); *G10L 2015/228* (2013.01)

(58) Field of Classification Search
CPC ..................................... G10L 15/22–2015/228
See application file for complete search history.

(56) References Cited

U.S. PATENT DOCUMENTS 9,378,740 B1 *   6/2016  Rosen ................. G10L 15/1822
10,049,663 B2 *  8/2018  Orr ......................... G10L 17/22
2014/0033238 A1 * 1/2014  Jeon ................... H04N 21/4334
                                                      725/13
2015/0134333 A1  5/2015  Sim et al.
(Continued)

FOREIGN PATENT DOCUMENTS

CN     106462617 A  *  2/2017  ............. G06F 16/73
KR     10-2014-0013620 A    2/2014
(Continued)

*Primary Examiner* — Abul K Azad
(74) *Attorney, Agent, or Firm* — Birch, Stewart, Kolasch & Birch, LLP

(57) ABSTRACT

A display device for providing a speech recognition service according to an embodiment of the present disclosure can include a storage unit configured to store a user's viewing history, a display unit, and a control unit configured to acquire a plurality of recommended utterance words based on the stored viewing history information, receive a command for requesting the speech recognition service, and display the plurality of acquired recommended utterance words on the display unit according to the received command.

15 Claims, 10 Drawing Sheets

(56) References Cited

U.S. PATENT DOCUMENTS

| | | | | |
|---|---|---|---|---|
| 2015/0254057 A1* | 9/2015 | Klein | ................. | H04N 21/4668 |
| | | | | 704/275 |
| 2015/0382047 A1* | 12/2015 | Van Os | .............. | H04N 21/2541 |
| | | | | 725/38 |
| 2017/0097618 A1* | 4/2017 | Cipollo | ................... | G10L 15/22 |
| 2019/0132645 A1* | 5/2019 | Kim | ................... | H04N 21/4532 |
| 2021/0250651 A1* | 8/2021 | Kim | ................... | H04N 21/4532 |

FOREIGN PATENT DOCUMENTS

| | | |
|---|---|---|
| KR | 10-2014-0089861 A | 7/2014 |
| KR | 10-2017-0129398 A | 11/2017 |
| KR | 10-2018-0024927 A | 3/2018 |

* cited by examiner

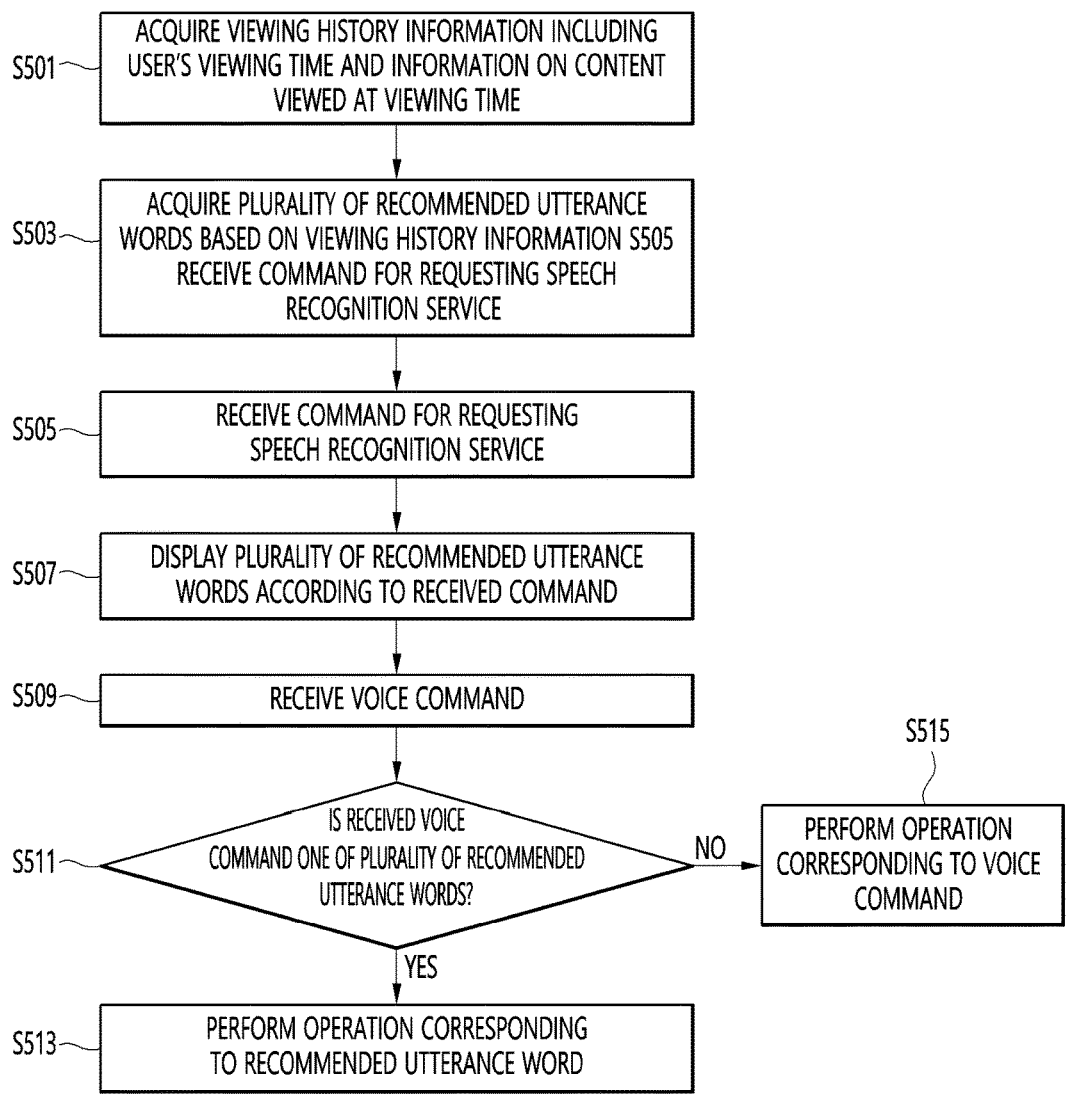
FIG. 5
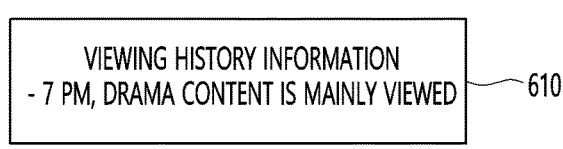
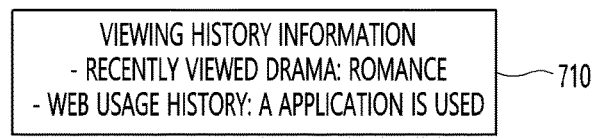
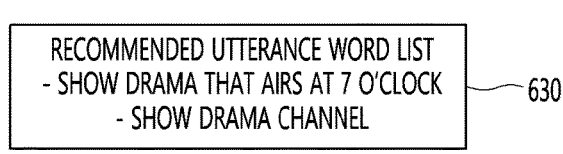
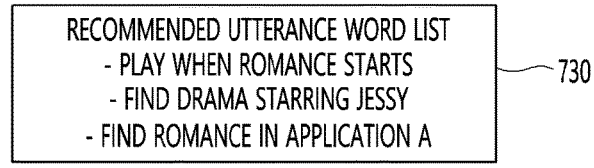
FIG. 6
FIG. 7

| PRIORITY | UTTERANCE WORD ACQUISITION TYPE |
|---|---|
| 1 | BASED ON VIEWING HISTORY INFORMATION |
| 2 | BASED ON UTTERANCE HISTORY INFORMATION |
| 3 | BASED ON VIEWING SITUATION INFORMATION |
| 4 | BASED ON LOCATION INFORMATION |
| 5 | BASED ON USER'S UNUSED UTTERANCE WORDS |

DISPLAY DEVICE FOR PROVIDING SPEECH RECOGNITION SERVICE

CROSS REFERENCE TO RELATED APPLICATIONS

This application is the National Phase of PCT International Application No. PCT/KR2019/005169, filed on Apr. 30, 2019, which is hereby expressly incorporated by reference into the present application.

TECHNICAL FIELD

The present disclosure relates to a display device capable of recommending utterance words to a user when providing a speech recognition service.

BACKGROUND ART

Digital TV services using wired or wireless communication networks are becoming common.

Digital TV services are capable of providing various services that could not be provided by the existing analog broadcasting services.

For example, Internet Protocol Television (IPTV) and smart TV services, which are types of digital TV services, provide interactivity so that users can actively select the types of programs, the viewing time, and the like.

The IPTV and smart TV services can provide various additional services, such as Internet search, home shopping, and online games, based on such interactivity.

In addition, recent TVs provide a speech recognition service that recognizes a speech uttered by a user and performs a function corresponding to the speech.

A conventional speech recognition service induces a user's utterance by providing limited utterance words that do not reflect the user's viewing history, viewing situation, and utterance history.

However, the provision of such limited utterance words has a limitation in effectively providing the speech recognition service, and furthermore, the use of the speech recognition service is limited for users who have difficulty in using speech.

DISCLOSURE OF INVENTION

Technical Problem

The present disclosure aims to provide a display device capable of recommending utterance words suitable for a user based on at least one of a user's viewing history, utterance history, or viewing situation.

The present disclosure aims to provide a display device capable of facilitating access to a speech recognition service by recommending utterance words suitable for a user even for a user having difficulty in using speech.

Technical Solution

A display device for providing a speech recognition service according to an embodiment of the present disclosure can include a storage unit configured to store a user's viewing history, a display unit, and a control unit configured to acquire a plurality of recommended utterance words based on the stored viewing history information, receive a command for requesting the speech recognition service, and display the plurality of acquired recommended utterance words on the display unit according to the received command.

The viewing history information may include a viewing time of content and a genre of the content.

When the content of the genre is viewed a preset number of times or more for the viewing time, the control unit can be configured to acquire a text including the viewing time and the genre as a recommended utterance word.

The control unit can be configured to receive a voice command and perform an operation corresponding to a recommended utterance word when the received voice command is any one of the plurality of recommended utterance words.

The control unit can be configured to further acquire viewing situation information and acquire a recommended utterance word based on the viewing situation information.

The viewing situation information can include at least one of information on an external device capable of interworking with the display device, a user's schedule information, or weather information.

The storage unit can be configured to store an utterance history including utterance words previously uttered by the user at the time of using the speech recognition service, and the control unit can be configured to acquire the utterance history stored in the storage unit as a recommended utterance word.

The plurality of recommended utterance words can be acquired based on the viewing history information, the utterance history information, and viewing situation information, the control unit can be configured to list each of the plurality of recommended utterance words in the order of priority, and a priority of a first recommended utterance word based on the viewing history information can be higher than a priority of a second recommended utterance word based on the utterance history information, and the priority of the second recommended utterance word can be higher than a priority of a third recommended utterance word based on the viewing situation information.

The plurality of recommended utterance words can be personalized utterance words. A recommended utterance word including a blank among the plurality of recommended utterance words can be displayed separately from other recommended utterance words. The blank can be provided to induce the user to utter an utterance word corresponding to the blank, and the control unit can be configured to perform no operation when the recommended utterance word including the blank is selected.

Each of the plurality of recommended utterance words can be selected through a remote control device, or is selected through a user's voice command.

The display device can further include a wireless communication unit, wherein the control unit can be configured to receive the command for requesting the speech recognition service from a remote control device through the wireless communication unit.

The control unit can be configured to transmit the viewing history information to a server and receive the plurality of recommended utterance words from the server.

When receiving the command for requesting the speech recognition service, the control unit can be configured to transmit the viewing history information to the server, and receive the plurality of recommended utterance words from the server.

Advantageous Effects

According to embodiments of the present disclosure, recommended utterance words are provided to a user by using a user's viewing history, viewing situation, utterance history, and the like, thereby allowing the user to more easily use a speech recognition service function.

In addition, the speech recognition service function can be conveniently provided to a user who has difficulty in using a speech recognition service.

BRIEF DESCRIPTION OF DRAWINGS

FIG. 5 is a flowchart for describing an operating method of a display device according to an embodiment of the present disclosure.

FIGS. 6 and 7 are views illustrating examples of recommended utterance words acquired based on a user's viewing pattern according to an embodiment of the present disclosure.

BEST MODE FOR CARRYING OUT THE INVENTION

Hereinafter, embodiments relating to the present disclosure will be described in detail with reference to the accompanying drawings.

The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function.

Then, with the support of a wired or wireless Internet function, it is possible to perform an e-mail, web browsing, banking, or game function in access to Internet and computers.

In order to perform such various functions, standardized general purpose OS can be used. Accordingly, since various applications are freely added or deleted on a general purpose OS kernel, a display device described herein, for example, can perform various user-friendly functions.

The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
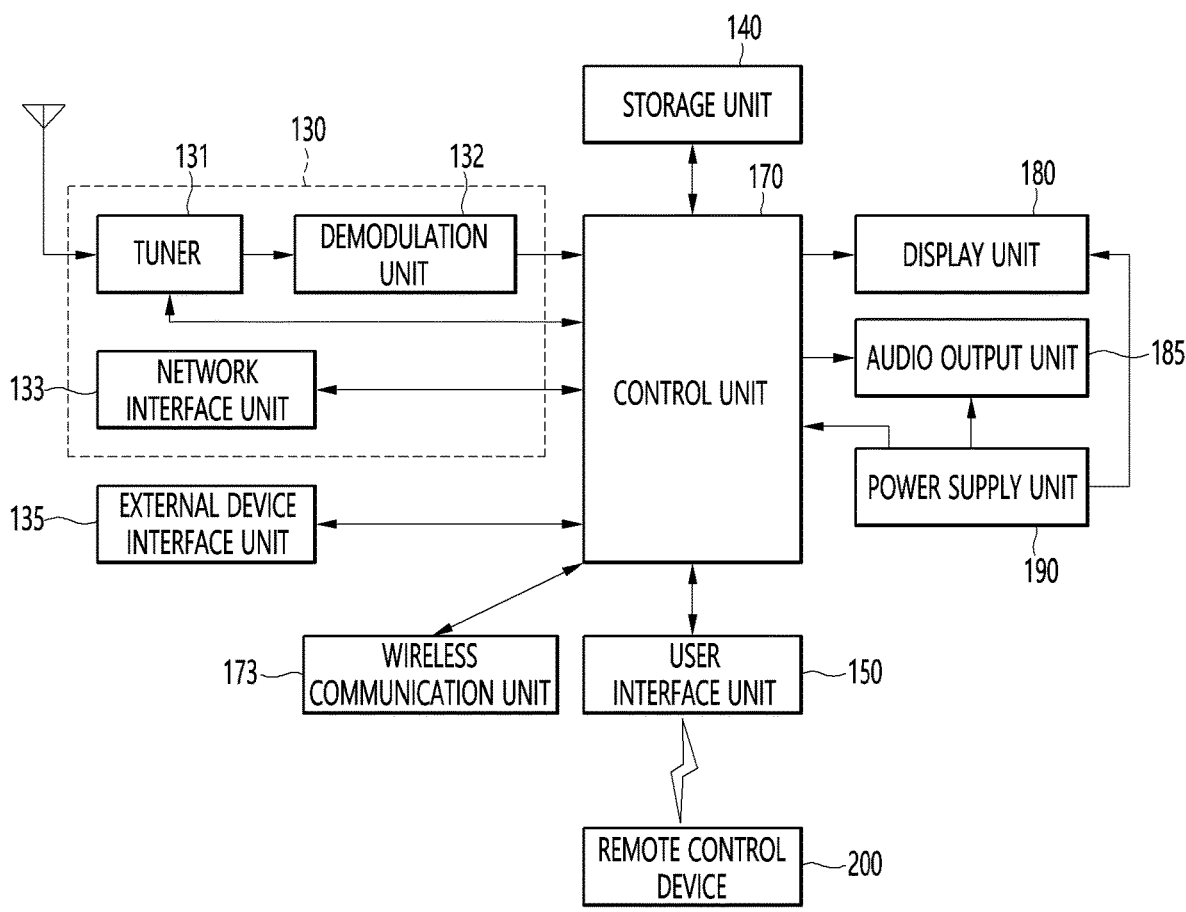
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command.

The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device.

The external device interface unit 135 can receive at least one an image or audio output from an external device that is wirelessly or wiredly connected to the display device 100 and deliver it to the control unit 170.

The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180.

A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network.

The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network.

That is, the network interface unit 133 can transmit or receive data to or from a corresponding server by accessing a predetermined webpage through the network.

Then, the network interface unit 133 can receive contents or data provided from a content provider or a network operator.

That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user.

For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals.

Additionally, image signals that are image-processed in the control unit 170 can be input to an external output device through the external device interface unit 135.

Voice signals processed in the control unit 170 can be output to the audio output unit 185.

Additionally, voice signals processed in the control unit 170 can be input to an external output device through the external device interface unit 135.

Besides that, the control unit 170 can control overall operations in the display device 100.

Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180.

In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device.

The wireless communication unit 173 can perform short-range communication with an external device.

For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies.

The wireless communication unit 173 can support wireless communication between the display device 100 and a wireless communication system, between the display device 100 and another display device 100, or between networks including the display device 100 and another display device 100 (or an external server) through wireless area networks.

The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100.

The wireless communication unit 173 can detect (or recognize) a communicable wearable device around the display device 100.

Furthermore, if the detected wearable device is a device authenticated to communicate with the display device 100, the control unit 170 can transmit at least part of data processed in the display device 100 to the wearable device through the wireless communication unit 173.

Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured.

Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

Figure 2:
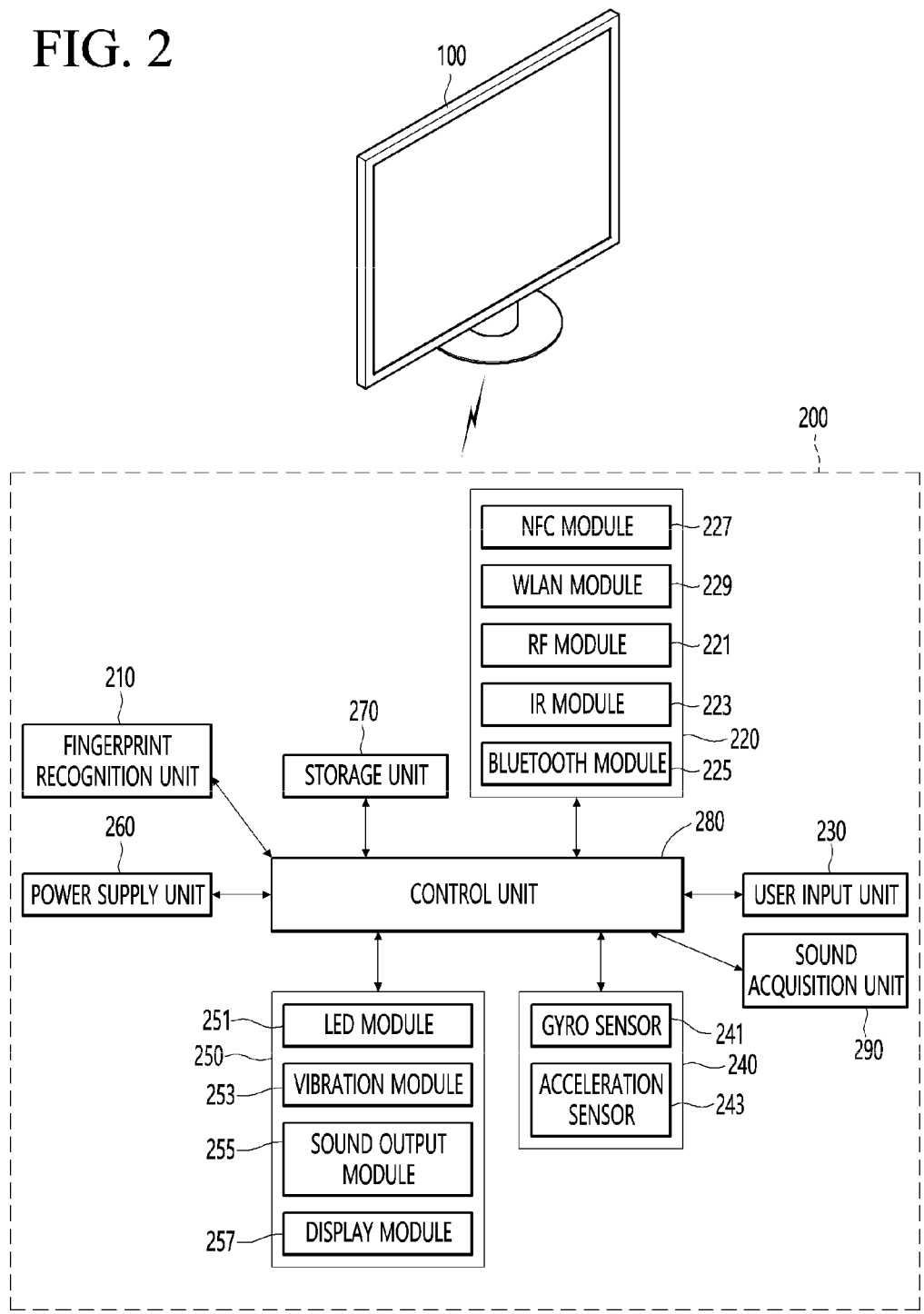
FIG. 2 is a block diagram illustrating a remote control device according to an embodiment of the present disclosure.
Figure 3:
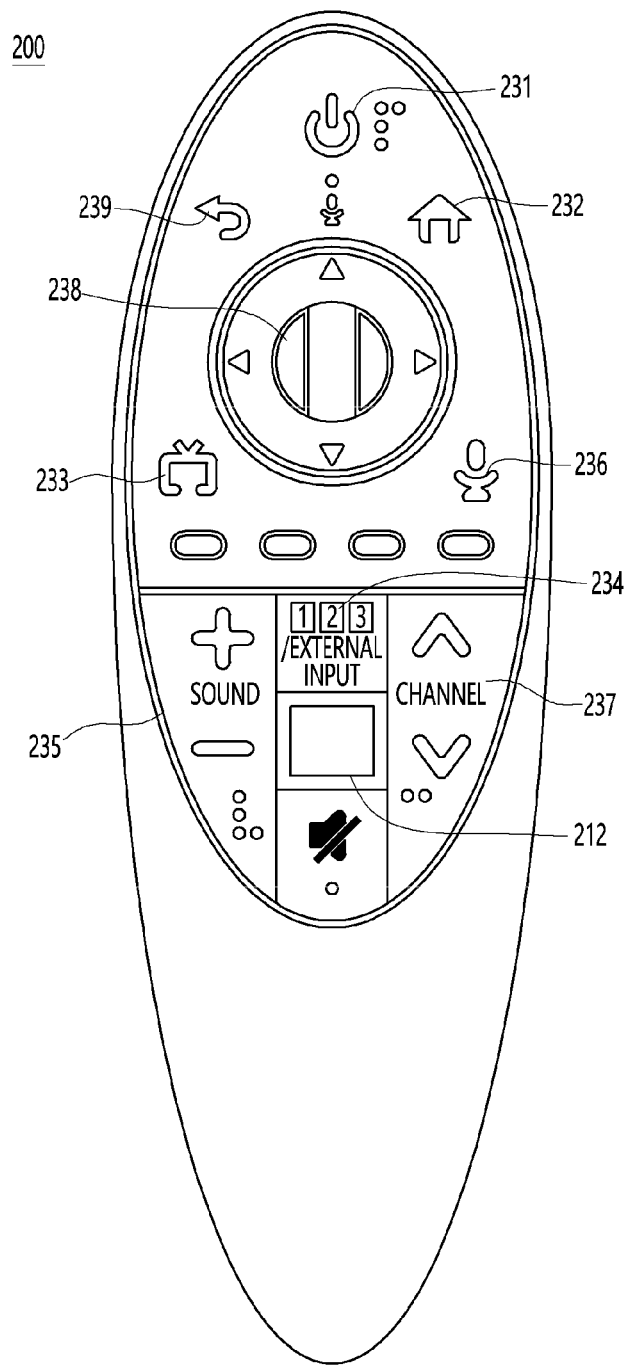
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards.

Additionally, the remote control device 200 can include a Bluetooth module 225 for transmitting/receiving signals to/from the display device 100 according to the Bluetooth communication standards.

Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen.

A user can manipulate the user input unit 230 to input a command relating to the display device 100 to the remote control device 200.

If the user input unit 230 includes a hard key button, a user can input a command relating to the display device 100 to the remote control device 200 through the push operation of the hard key button.

This will be described with reference to FIG. 3.

Referring to FIG. 3, the remote control device 200 can include a plurality of buttons.

The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation.

The power button 231 can be button for turning on/off the power of the display device 100. The home button 232 can be a button for moving to the home screen of the display device 100.

The live button 233 can be a button for displaying live broadcast programs.

The external input button 234 can be a button for receiving an external input connected to the display device 100.

The voice adjustment button 235 can be a button for adjusting the size of a volume output from the display device 100.

The voice recognition button 236 can be a button for receiving user's voice and recognizing the received voice.

The channel change button 237 can be a button for receiving broadcast signals of a specific broadcast channel.

The check button 238 can be a button for selecting a specific function and the back button 239 can be a button for returning to a previous screen.

Again, referring to FIG. 2, if the user input unit 230 includes a touch screen, a user can touch a soft key of the touch screen to input a command relating to the display device 100 to the remote control device 200.

Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200.

Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100.

A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced.

The power supply unit 260 can resume the power supply if a predetermined key provided at the remote control device 200 is manipulated.

The storage unit 270 can store various kinds of programs and application data necessary for control or operation of the remote control device 200.

If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200.

The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice.

The sound acquisition unit 290 can include at least one microphone and obtain voice through the microphone 291.

Figure 4:
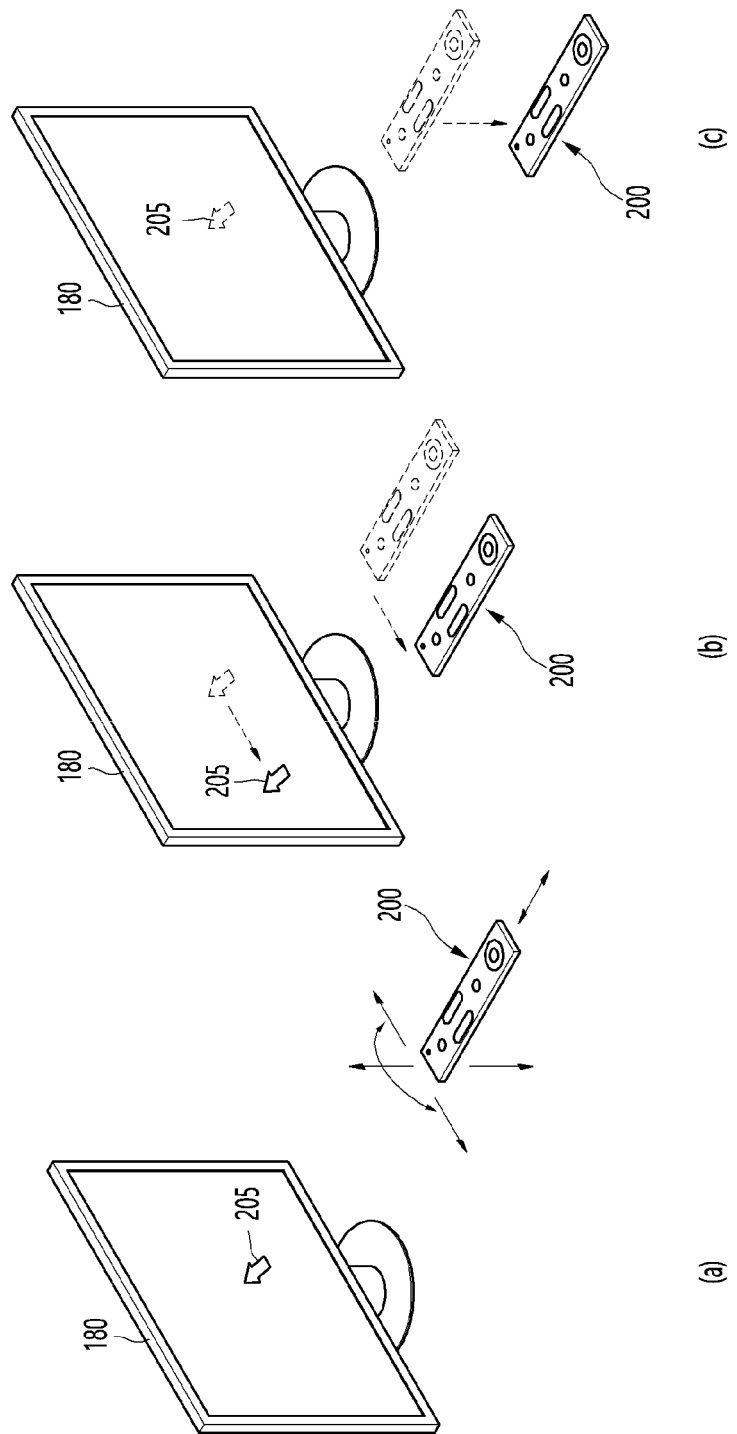
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(a) illustrates that a pointer 205 corresponding to the remote control device 200 is displayed on the display unit 180.

A user can move or rotate the remote control device 200 vertically or horizontally.

The pointer 205 displayed on the display unit 180 of the display device 100 corresponds to a movement of the remote control device 200.

Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100.

The display device 100 can calculate the coordinates of the pointer 205 from the information on the movement of the remote control device 200.

The display device 100 can display the pointer 205 to match the calculated coordinates. FIG. 4(c) illustrates that while a specific button in the remote control device 200 is pressed, a user moves the remote control device 200 away from the display unit 180.

Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded.

That is, if the remote control device 200 is moved away from or closer to the display unit 180, the up, down, left, or right movement cannot be recognized and only the back and forth movement can be recognized.

While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200.

Accordingly, besides an arrow form displayed as the pointer 205 in the drawing, various forms of objects are possible.

For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Next, an embodiment of recommending utterance words to a user when a speech recognition service is provided will be described with reference to the accompanying drawings.

FIG. 5 is a flowchart for describing an operating method of the display device according to an embodiment of the present disclosure.

The control unit 170 of the display device 100 acquires viewing history information including a user's viewing time and information on content viewed at the corresponding viewing time (S501).

The viewing history information can include at least one of the viewing time for which a user views the content through the display device 100, channel information of the content, the genre of the content viewed for the viewing time, the name of the content, the name of the application used when viewing the content, or the usage history of the content provider (or the content provider's application) used when viewing the content.

The content can include a broadcast program, a web video viewed through a web service, and the like.

When the content is a broadcast program, the control unit 170 can acquire the name of the program and the genre of the program from an electronic program guide (EPG).

When the content is a web moving picture, the control unit 170 can identify the genre of the web moving picture by using the name of the content.

In an embodiment, the control unit 170 can acquire the genre of the content only for the content that has been reproduced for a predetermined time or longer.

That is, the control unit 170 may not collect content information for the content viewed by the user's temporary channel change.

On the other hand, the user's viewing history information can be stored in the storage unit 140.

The user's viewing history information can be periodically updated.

The control unit 170 acquires a plurality of recommended utterance words based on the viewing history information (S503).

In an embodiment, the control unit 170 can acquire, based on the viewing history information, one or more recommended utterance words to be provided to the user when the speech recognition service is provided.

For example, the control unit 170 may acquire a plurality of recommended utterance words by analyzing the viewing history information by itself.

As another example, the control unit 170 can transmit the viewing history information to a server (not shown), and the server can acquire a plurality of utterance words by analyzing the viewing history information. The control unit 170 can receive the plurality of recommended utterance words from the server.

The control unit 170 can identify the user's viewing pattern from the viewing history information, and can acquire recommended utterance words matching the identified viewing pattern.

FIGS. 6 and 7 are views illustrating examples of recommended utterance words acquired based on the user's viewing pattern according to an embodiment of the present disclosure.

FIG. 6 illustrates viewing history information 610 acquired by the control unit 170 and a recommended utterance word list 630 including a plurality of recommended utterance words acquired based on the viewing history information 610.

The control unit 170 may identify the genre of content that the user views through the display device 100 at a specific time zone during a predetermined period of time. Here, the predetermined period of time can be one month, but this is just exemplary.

For example, if the number of times the user viewed drama content at 7 pm during one month is a certain number of times or more, the control unit 170 can acquire the viewing history information 610 of <7 pm, drama content is mainly viewed>.

The control unit 170 can acquire recommended utterance words such as <Show a drama that airs at 7 o'clock> and <Show a drama channel> that match the acquired viewing history information 610.

That is, the control unit 170 may acquire a text including the viewing time and the genre as the recommended utterance words.

When the display device 100 is turned on before or after 7 pm, the control unit 170 may display, on the display unit 180, the recommended utterance word list 630 including the recommended utterance words.

FIG. 7 illustrates viewing history information 710 acquired by the control unit 170 and a recommended utterance word list 730 including a plurality of recommended utterance words acquired based on the viewing history information 710.

The control unit 170 can acquire, as the viewing history information 710, the name of the content that the user most recently viewed through the display device 100 and the name of the application (or the name of the content provider) used when viewing the content. On the basis of the acquired viewing history information 710, the control unit 170 can acquire the recommended utterance word list 730 including the recommended utterance words such as <Play when a romance starts>, <Find a drama starring Jessy>, and <Find a romance in application A> that match the viewing history information 710.

That is, the control unit 170 can generate the recommended utterance words by reflecting the viewing history information 710 including the name of the drama that the user recently viewed, the name of the main character appearing in the drama, and the name of the application providing the drama.

That is, according to an embodiment of the present disclosure, instead of the utterance words for simple search such as the name of the content, the user-customized utterance words such as the genre of the content, the characters of the content, and the name of the content provider providing the content can be provided.

On the other hand, according to another embodiment of the present disclosure, the control unit 170 may acquire recommended utterance words by further considering the viewing situation information in addition to the viewing history information.

The viewing situation information can be information on the viewing situation of the display device 100.

The viewing situation information can include one or more of information on an external device capable of interworking with the display device 100, status information on a home appliance, user's schedule information, and weather information at the time of viewing content.

Figure 8:
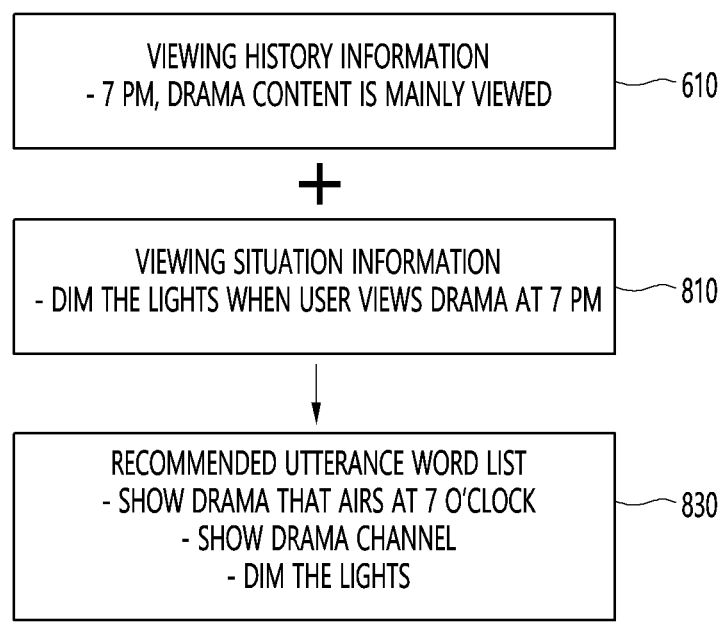
FIG. 8 is a view for describing an example of recommended utterance words acquired by additionally considering a viewing situation according to an embodiment of the present disclosure.

FIG. 8 is a view for describing an example of recommended utterance words acquired by additionally considering the viewing situation according to an embodiment of the present disclosure.

It is assumed that the viewing history information 610 according to the embodiment of FIG. 6 is used.

In addition, the viewing situation information can be information about a situation (dim processing) in which the light in the house is dimly adjusted when the user views drama content at 7 pm.

The control unit 170 can acquire, as the viewing situation information 810, a situation in which the light is dimly adjusted when the light in the house is dimmed more than a certain number of times when the user views the drama content at 7 pm.

The control unit 170 can acquire recommended utterance words based on the viewing history information 610 and the viewing situation information 810.

That is, the control unit 170 can acquire, in addition to the recommended utterance words such as <Show a drama that airs at 7 o'clock> and <Show a drama channel> that match the viewing history information 610, a recommended utterance word list 830 including recommended utterance words such as <Dim the lights> that match the viewing situation information 810.

As another example, the control unit 170 can receive weather information from the server and can acquire recommended utterance words based on the weather information.

For example, if the current weather is rainy, the control unit 170 may acquire recommended utterance words such as <Play a music channel that is good to listen to on a rainy day>.

According to another embodiment of the present disclosure, the control unit 170 can acquire one or more recommended utterance words based on the utterance history.

The control unit 170 can collect utterance words uttered by the user and can acquire the collected utterance words as the recommended utterance words.

The control unit 170 can acquire, as the recommended utterances, only utterance words uttered a certain number of times or more among the collected utterance words.

According to another embodiment of the present disclosure, the control unit 170 can acquire the recommended utterance words based on the location of the display device 100.

For example, when the location of the display device 100 is a specific area, a channel or a name of a program broadcast only in the specific area can be acquired as the recommended utterance words.

According to another embodiment of the present disclosure, the control unit 170 may acquire, as the recommended utterance words, an utterance word that the user does not use.

The control unit 170 can acquire, as the recommended utterance words, an utterance word that the user does not use and the manufacturer of the display device 100 can provide.

Again, FIG. 5 is described.

The control unit 170 receives a command for requesting a speech recognition service (S505), and displays a plurality of recommended utterance words on the display unit 180 according to the received command (S507).

In an embodiment, the control unit 170 may receive, from the remote control device 200, a command for requesting a speech recognition service.

The user can select the voice recognition button 236 provided in the remote control device 200.

The remote control device 200 may transmit, to the display device 100, a signal requesting the provision of the speech recognition service according to the selection of the voice recognition button 236.

The control unit 170 can receive, from the remote control device 200, the signal requesting the provision of the speech recognition service, and can display, on the display unit 180, a speech recognition service screen for providing the speech recognition service according to the received signal.

As another example, the command for requesting the speech recognition service may be received through a user's voice command.

The control unit 170 can receive a voice command requesting the provision of the speech recognition service through a microphone (not shown) provided in the display device 100.

The control unit 170 may recognize the received voice command and display the speech recognition service screen on the display unit 180.

The voice command for requesting the provision of the speech recognition service may be a wake-up command for activating the speech recognition service of the display device 100.

The speech recognition service screen can include a plurality of acquired recommended utterance words.

Figure 9:
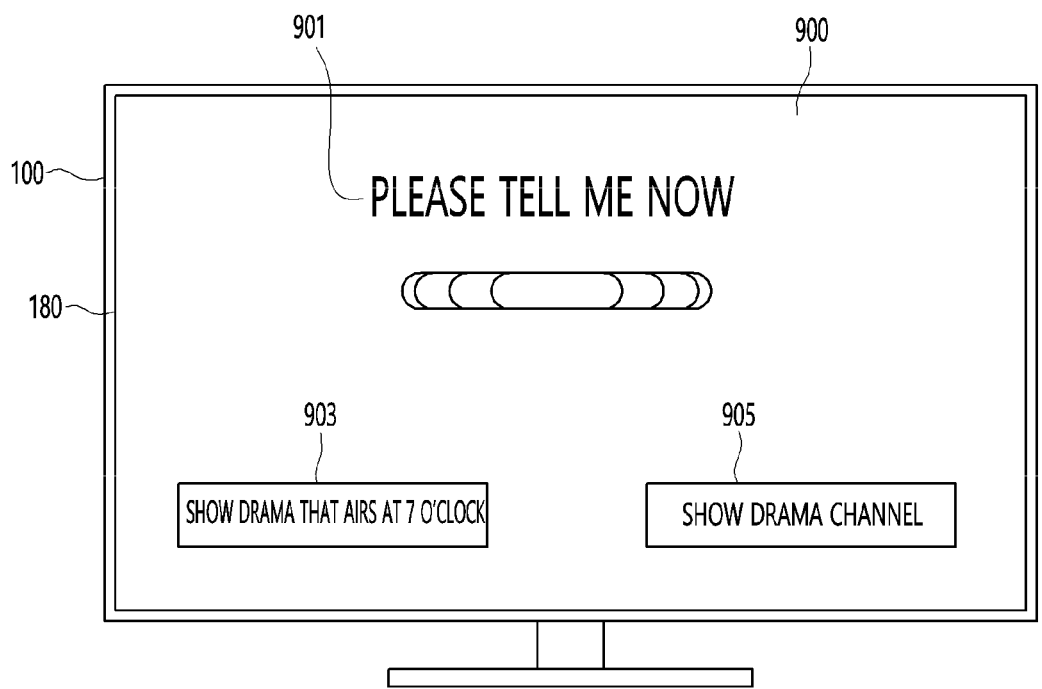
FIGS. 9 to 11 are views for describing examples of speech recognition service screens including a plurality of recommended utterance words according to various embodiments of the present disclosure.
Figure 9:
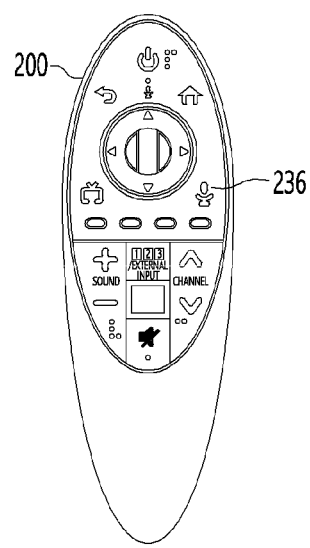
Figure 10:
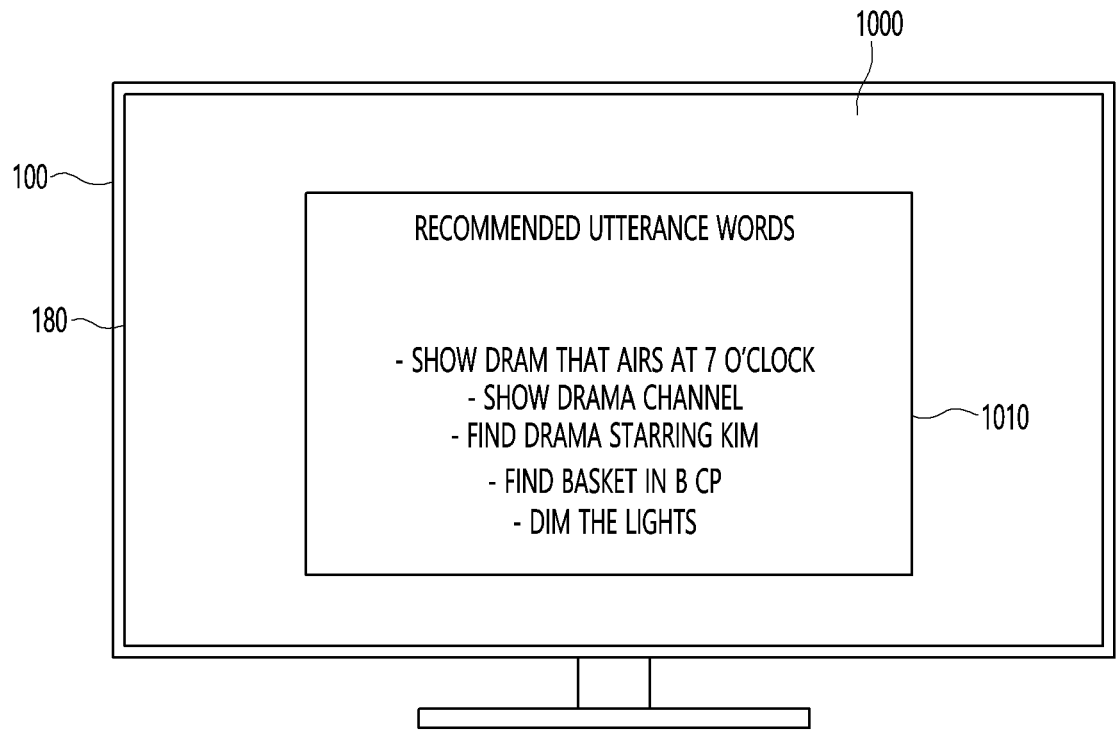
Figure 11:
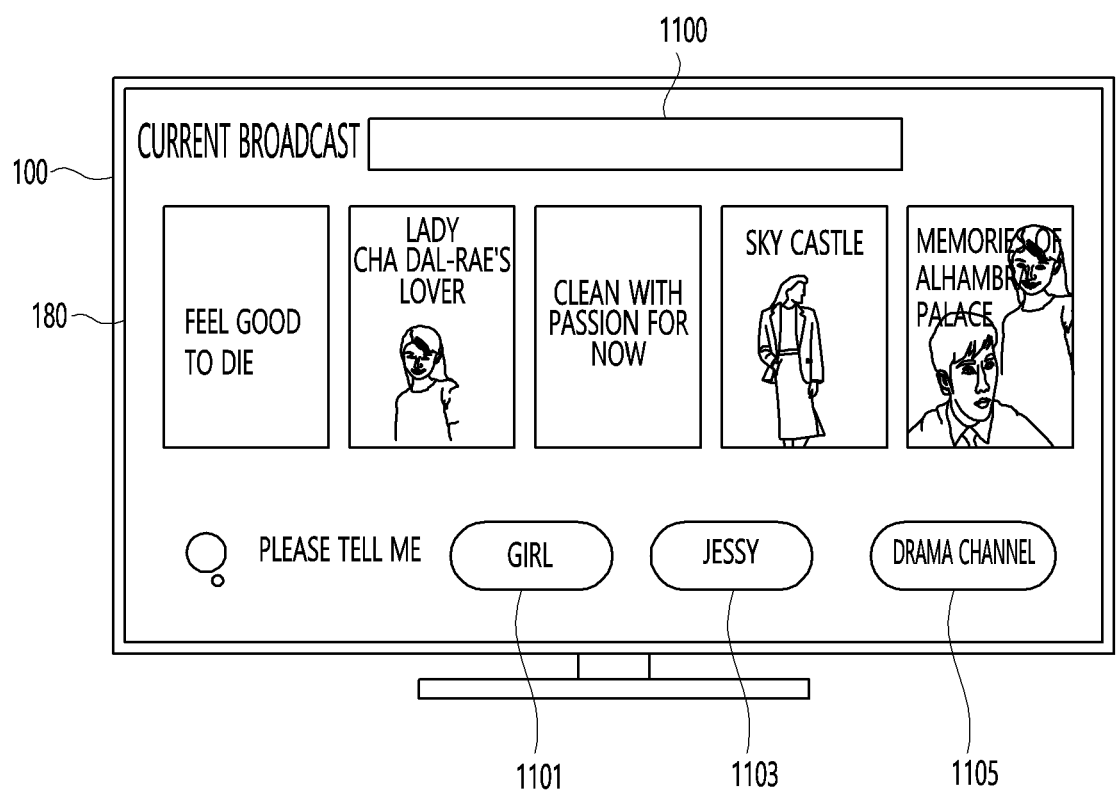

FIGS. 9 to 11 are views for describing examples of speech recognition service screens including a plurality of recommended utterance words according to various embodiments of the present disclosure.

First, FIG. 9 is described.

In particular, FIG. 9 is a view for describing an example of displaying a plurality of recommended utterance words 903 and 905 through an initial provision screen 900 for a speech recognition service.

The control unit 170 of the display device 100 can receive, from the remote control device 200, a command for providing the speech recognition service, and can display, on the display unit 180, the initial provision screen 900 for the speech recognition service according to the received command.

That is, as the microphone-shaped voice recognition button 236 is selected, the remote control device 200 can transmit, to the display device 100, the command for requesting the speech recognition service.

The control unit 170 of the display device 100 can display, on the display unit 180, the initial provision screen 900 including a plurality of recommended utterance words 903 and 905 according to the command received from the remote control device 200.

The initial provision screen 900 can include the text 901 for inducing the utterance of the voice and the plurality of recommended utterance words 903 and 905.

Each of the plurality of recommended utterance words 903 and 905 can be utterance words generated based on the viewing history information 610 of FIG. 6.

As described above, according to an embodiment of the present disclosure, the user can be guided to customized utterance words only by selecting the voice recognition button 236 provided in the remote control device 200.

Accordingly, the user can access the content of interest more conveniently and quickly. On the other hand, as the user utters any one of the plurality of recommended utterance words 903 and 905 included on the initial provision screen 900, the speech recognition service corresponding to the corresponding utterance word can be provided.

That is, the display device 100 can receive the recommended utterance words uttered by the user and can display a search result corresponding to the received utterance words.

As another example, when the user selects any one of the plurality of recommended utterance words 903 and 905 through the remote control device 200, the speech recognition service corresponding to the corresponding utterance word may be provided.

That is, the display device 100 can display a search result corresponding to the selected utterance word according to the command for selecting the utterance word received from the remote control device 200.

FIG. 10 is a view for describing an example of providing a plurality of recommended utterance words on an utterance guide screen 1000.

When the display device 100 receives a command for requesting a speech recognition service, the display device 100 can display the utterance guide screen 1000 on the display unit 180.

The speech guide screen 1000 can be a screen for guiding a user to utter a suitable utterance word.

The utterance guide screen 1000 can include a recommended utterance word list 1010 including recommended utterance words acquired based on at least one of viewing history information or viewing situation information.

The user can receive desired content only by reading the recommended utterance words or selecting the recommended utterance words without having to worry about the utterance words through the customized recommended utterance words included in the utterance guide screen 1000.

FIG. 11 is a view for describing an example of providing recommended utterance words through a content search result screen 1100.

When the display device 100 receives a command for requesting content search, the display device 100 can display, on the display unit 180, the content search result screen 1100 indicating a content search result.

The content search result screen 1100 can include recommended utterance words 1101, 1103, and 1105 acquired based on at least one of viewing history information or viewing situation information.

The user can receive desired content only by reading the recommended utterance words or selecting the recommended utterance words without having to worry about the utterance words through the customized recommended utterance words included in the content search result screen 1100.

The control unit 170 receives a voice command (S509), and determines whether the received voice command is one of a plurality of recommended utterance words displayed on the display unit 180 (S511).

In an embodiment, the control unit 170 may receive the voice command from the remote control device 200.

That is, the user can receive the voice command through a microphone provided in the remote control device 200, and can transmit the received voice command to the display device 100 through short-range wireless communication.

In still another embodiment, the control unit 170 can directly receive a user's voice command through a microphone provided in the display device 100.

When the received voice command is any one of the plurality of recommended utterance words, the control unit 170 performs an operation corresponding to the recommended utterance word (S513).

The control unit 170 can analyze the intention of the recommended utterance word by using a natural language processing engine of the recommended utterance word, and can perform an operation according to the analyzed intention.

For example, when the recommended utterance word is an utterance word corresponding to the content search, the control unit 170 can search for content corresponding to the recommended utterance word and can display the search result on the display unit 180. On the other hand, the recommended utterance words can be selected through the voice command uttered by the user, or can be selected by the pointer 205 (see FIG. 2) controlled according to the movement of the remote control device 200.

When the received voice command is not included in the plurality of recommended utterance words, the control unit 170 performs an operation corresponding to the voice command (S515).

When the received voice command is not any one of the plurality of recommended utterance words, the control unit 170 can analyze the intention of the voice command and can perform an operation according to the analyzed intention.

The control unit 170 can analyze the intention of the voice command by using a natural language processing engine, and can perform an operation according to the analyzed intention.

According to still another embodiment of the present disclosure, a plurality of recommended utterance words can be listed based on priority.

Figures 12, 13:
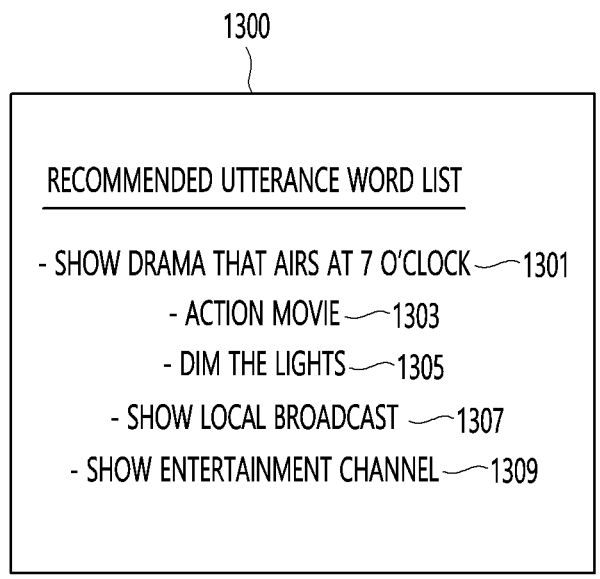
FIGS. 12 and 13 are views for describing an example in which a plurality of recommended utterance words are listed in the order of priority according to an embodiment of the present disclosure.

FIGS. 12 and 13 are views for describing an example in which a plurality of recommended utterance words are listed in the order of priority according to an embodiment of the present disclosure.

First, FIG. 12 is described.

FIG. 12 is a view for describing the priority as the standard for listing the plurality of recommended utterance words.

The control unit 170 can list the plurality of recommended utterance words on the display unit 180 according to the priority.

The control unit 170 can determine the priority based on the acquired type of the recommended utterance word.

For example, the control unit 170 can set viewing history information, which is the basis for acquiring the recommended utterance words, as the first priority, utterance history information as the second priority, viewing situation information as the third priority, location information as the fourth priority, and the user's unused utterance words as the fifth priority.

The priorities according to the acquired type of the utterance words shown in FIG. 12 are exemplary and can vary according to a user's setting.

As the priority corresponding to the acquired type of the utterance word is higher, the control unit 170 can arrange the corresponding recommended utterance word at the uppermost position, and as the priority is lower, the control unit 170 can arrange the corresponding recommended utterance word at the lowermost position.

FIG. 13 illustrates a recommended utterance word list 1300 displayed on the display unit 180 when the speech recognition service is provided.

The control unit 170 can arrange a first recommended utterance word 1301 acquired based on the viewing history information corresponding to the first priority at the uppermost position of the recommended utterance word list 1300.

The control unit 170 can arrange a second recommended utterance word 1303 acquired based on the utterance history information corresponding to the second priority the position below the first recommended utterance word 1301.

In addition, the control unit 170 can arrange a third recommended utterance word 1305 acquired based on the viewing situation information corresponding to the third priority at the position below the second recommended utterance word 1303.

The control unit 170 can arrange a fourth recommended utterance word 1307 acquired based on the position information corresponding to the fourth priority at the position below the third recommended utterance word 1305.

The control unit 170 can arrange the user's unused utterance word 1309 corresponding to the fifth priority at the lowermost position.

On the other hand, the user's unused utterance word 1309 can be an utterance word corresponding to a speech recognition function recommended by the manufacturer of the display device 100.

Figure 14:
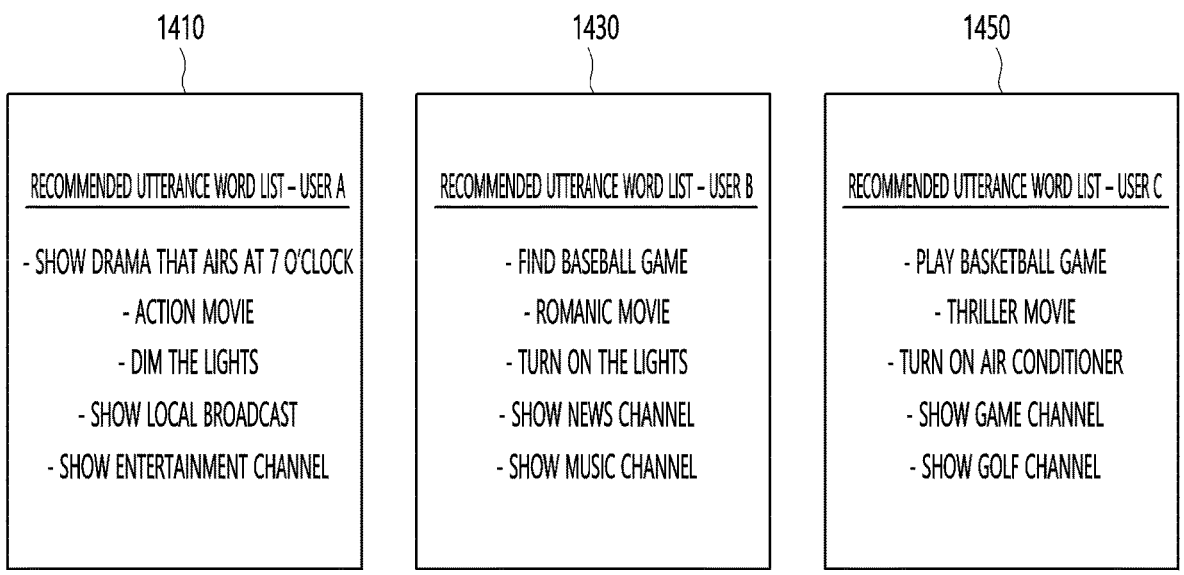
FIG. 14 is a view for describing an example of providing personalized recommended utterance words to each of a plurality of users according to an embodiment of the present disclosure.

FIG. 14 is a view for describing an example of providing personalized recommended utterance words to each of a plurality of users according to an embodiment of the present disclosure.

The control unit 170 can provide a personalized recommended utterance word list to each of a plurality of users who use the display device 100.

That is, the control unit 170 can provide personalized recommended utterance words based on at least one of viewing history information, viewing situation information, or utterance history information of each of the plurality of users who use the display device 100.

For example, when a user A logs in to the display device 100, the control unit 170 can display, on the display unit 180, a first recommended utterance word list 1410 including the acquired recommended utterance words based on at least one of viewing history information, viewing situation information, or utterance history information of the user A. Similarly, when a user B logs in to the display device 100, the control unit 170 can display, on the display unit 180, a second recommended utterance word list 1430 including the acquired recommended utterance words based on at least one of viewing history information, viewing situation information, or utterance history information of the user B.

Figure 15:
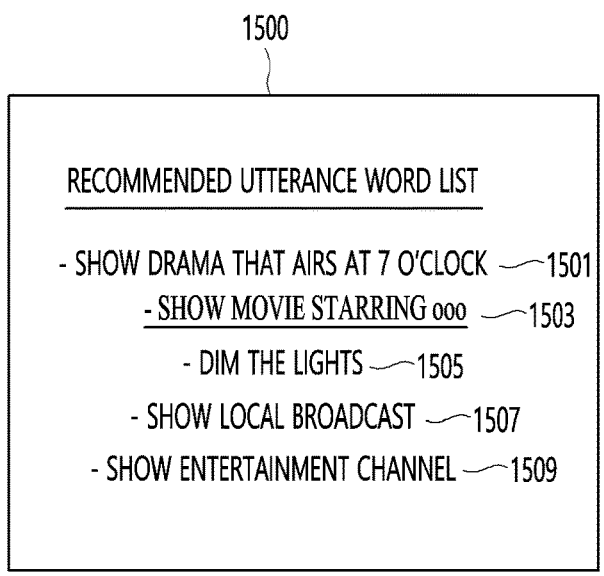
FIG. 15 is a view for describing an example of recommended utterance words including blanks according to an embodiment of the present disclosure.

For example, when a user C logs in to the display device 100, the control unit 170 can display, on the display unit 180, a third recommended utterance word list 1450 including the acquired recommended utterance words based on at least one of viewing history information, viewing situation information, or utterance history information of the user C. FIG. 15 is a view for describing an example of recommended utterance words including blanks according to an embodiment of the present disclosure.

Recommended utterance words recommended by the display device 100 can include some blanks.

This can be for inducing a user to directly utter a name of a person who wants to search for in the blank.

For example, referring to a recommended utterance word list 1500 of FIG. 15, a recommended utterance word 1503 including blanks among a plurality of recommended utterance words 1501 to 1509 is shown.

The recommended utterance word 1503 can include blanks in a portion corresponding to a character in a movie, such as <Find a movie starring 000>.

The user can utter a name of a movie actor he or she wants to search for in the blank, and can receive a search result of a movie starring the movie actor.

On the other hand, the recommended utterance word 1503 including the blanks can be displayed separately from other recommended utterance words 1501, 1505, 1507, and 1509.

In addition, the recommended utterance word 1503 including the blanks can be an utterance word that cannot be selected.

That is, the control unit 170 may not perform any operation even if the recommended utterance word 1503 including the blanks is selected.

The control unit 170 may display selectable recommended utterance words and non-selectable recommended utterance words in a distinguishing manner.

Figure 16:
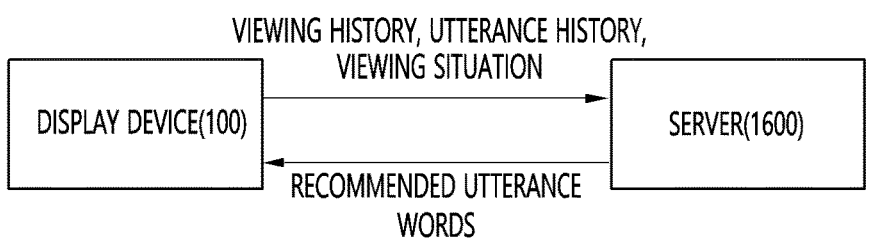
FIG. 16 is a view for describing a process of receiving recommended utterance words from a server according to another embodiment of the present disclosure.

FIG. 16 is a view for describing a process of receiving recommended utterance words from a server according to another embodiment of the present disclosure.

FIG. 16 illustrates a server 1600 that is connectable to the network interface unit 133 of the display device 100.

The display device 100 can transmit, to the server 1600, one or more of viewing history information, viewing situation information, and utterance history information.

The corresponding information can be periodically transmitted to the server 1600.

The server 1600 can generate recommended utterance words based on one or more of viewing history information, viewing situation information, and utterance history information, and can transmit the generated recommended utterance words to the display device 100.

On the other hand, when receiving a request for a speech recognition service, the display device 100 can display recommended utterance words received from the server 1600 and stored in advance when network connection delay or network disconnection occurs.

That is, even if there is a problem in network connection with the server 1600, the display device 100 can recommended utterance words to the user by using the recommended utterance words received from the server 1600 and stored in advance.

According to still another embodiment of the present disclosure, the display device 100 can acquire recommended utterance words based on the utterance history of an external device capable of interworking with the display device 100.

For example, when the external device capable of interworking with the display device 100 is a user's smartphone, the display device 100 can receive, from the smartphone, the utterance history uttered by the user through the smartphone having a speech recognition function.

The display device 100 can acquire recommended utterance words based on the utterance history received from the smartphone.

The display device 100 can recommend utterance words linked to a user's schedule. Based on schedule information, the display device 100 can display recommended utterance words before the time corresponding to the schedule information.

For example, when the user has a meeting at 3 pm, the display device 100 can display recommended utterance words such as <What should I do?> at 2 pm.

The schedule information can be information stored in the display device 100, or can be information received from a user's smartphone.

According to still another embodiment of the present disclosure, the display device 100 can acquire and display recommended utterance words based on viewing history information and an electronic program guide.

For example, when it is determined that the user has viewed a baseball game more than a preset number of times, the display device 100 can acquire recommended utterance words for inducing provision of a baseball score.

That is, based on the electronic program guide, when the baseball game program is being broadcast at the current time, the display device 100 can acquire recommended utterance words such as <Tell me about the baseball score> and can display the recommended utterance words on the display unit 180.

As described above, according to embodiments of the present disclosure, recommended utterance words are provided to a user by using the user's viewing history, viewing situation, utterance history, and the like, thereby allowing the user to more easily use the speech recognition service function.

In addition, the speech recognition service function can be conveniently provided to a user who has difficulty in using the speech recognition service.

According to an embodiment of the present disclosure, the above-described method can be implemented with codes readable by a processor on a medium in which a program is recorded.

Examples of the medium readable by the processor include a ROM, a RAM, a CD-ROM, a magnetic tape, a floppy disk, an optical data storage device, and the like, and can include those implemented in the form of carrier wave (for example, transmission over Internet).

The display device described above is not limitedly applicable to the configuration and method of the above-described embodiments, and the embodiments are configured by selectively combining all or part of each of the embodiments such that various modifications can be made.

The invention claimed is:

1. A display device for providing a speech recognition service, the display device comprising:
a storage unit configured to store a user's viewing history;
a display unit; and
a control unit configured to acquire a plurality of recommended utterance words based on the stored viewing history information, receive a command for requesting the speech recognition service, and display the plurality of acquired recommended utterance words on the display unit according to the received command,
wherein the control unit displays the plurality of recommended utterance words on the display unit based on at least one of turn-on information of the display unit and the stored viewing history information watching before or after turn-on, and
wherein the control unit is configured to further acquire viewing situation information including schedule information of a user received from a smartphone of the user interworking with the display device, acquire a recommended utterance word linked to the schedule information, and display the recommended utterance word linked to the schedule information before a time corresponding to the schedule information.

2. The display device of claim 1, wherein the viewing history information includes a viewing time of content and a genre of the content.

3. The display device of claim 2, wherein, when the content of the genre is viewed a preset number of times or more for the viewing time, the control unit is configured to acquire a text including the viewing time and the genre as a recommended utterance word.

4. The display device of claim 1, wherein the control unit is configured to receive a voice command and perform an operation corresponding to a recommended utterance word when the received voice command is any one of the plurality of recommended utterance words.

5. The display device of claim 1, wherein the control unit is configured to further acquire viewing situation information and acquire a recommended utterance word based on the viewing situation information.

6. The display device of claim 5, wherein the viewing situation information includes at least one of information on an external device capable of interworking with the display device, a user's schedule information, or weather information.

7. The display device of claim 1, wherein the storage unit is configured to store an utterance history including utterance words previously uttered by the user at the time of using the speech recognition service, and
wherein the control unit is configured to acquire the utterance history stored in the storage unit as a recommended utterance word.

8. The display device of claim 1, wherein the plurality of recommended utterance words are acquired based on the viewing history information, an utterance history information, and viewing situation information,
wherein the control unit is configured to list each of the plurality of recommended utterance words in the order of priority, and
wherein a priority of a first recommended utterance word based on the viewing history information is higher than a priority of a second recommended utterance word based on the utterance history information, and the priority of the second recommended utterance word is higher than a priority of a third recommended utterance word based on the viewing situation information.

9. The display device of claim 1, wherein the plurality of recommended utterance words are personalized utterance words.

10. The display device of claim 1, wherein a recommended utterance word including a blank among the plurality of recommended utterance words is displayed separately from other recommended utterance words.

11. The display device of claim 10, wherein the blank is provided to induce the user to utter an utterance word corresponding to the blank, and
wherein the control unit is configured to perform no operation when the recommended utterance word including the blank is selected.

12. The display device of claim 1, wherein each of the plurality of recommended utterance words is selected through a remote control device, or is selected through a user's voice command.

13. The display device of claim 1, further comprising a wireless communication unit,
wherein the control unit is configured to receive the command for requesting the speech recognition service from a remote control device through the wireless communication unit.

14. The display device of claim 1, wherein the control unit is configured to transmit the viewing history information to a server and receive the plurality of recommended utterance words from the server.

15. The display device of claim 14, wherein, when receiving the command for requesting the speech recognition service, the control unit is configured to transmit the viewing history information to the server, and receive the plurality of recommended utterance words from the server.

* * * * *